(12) United States Patent
Vandergucht (10) Patent No.: US 10,091,940 B2
(45) Date of Patent: Oct. 9, 2018

(54) STRAW WALKER ARRANGEMENT FOR AN AGRICULTURAL HARVESTER

(71) Applicant: CNH Industrial America LLC, New Holland, PA (US)

(72) Inventor: Yvan C. C. Vandergucht, Lo-Reninge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/320,851

(22) PCT Filed: Jun. 22, 2015

(86) PCT No.: PCT/EP2015/063931
§ 371 (c)(1),
(2) Date: Dec. 21, 2016

(87) PCT Pub. No.: WO2015/197525
PCT Pub. Date: Dec. 30, 2015

(65) Prior Publication Data
US 2017/0142903 A1    May 25, 2017

(30) Foreign Application Priority Data
Jun. 23, 2014    (BE) .................................. 2014/0489

(51) Int. Cl.
*A01F 12/39* (2006.01)
*A01F 12/44* (2006.01)
(Continued)

(52) U.S. Cl.
CPC .............. *A01F 12/39* (2013.01); *A01D 34/02* (2013.01); *A01D 41/06* (2013.01); *A01D 57/02* (2013.01);
(Continued)

(58) Field of Classification Search
CPC ........ A01F 12/39; A01F 12/446; A01F 12/30; A01F 12/44; A01F 12/315; A01F 12/46;
(Continued)

(56) References Cited

U.S. PATENT DOCUMENTS 751,657 A * 2/1904 Krueger
798,957 A * 9/1905 Good
(Continued)

FOREIGN PATENT DOCUMENTS

DE        250636 C      10/1911
DE        404817 C      1/1924
(Continued)

*Primary Examiner* — John Weiss
(74) *Attorney, Agent, or Firm* — Peter K. Zacharias; Patrick M. Sheldrake (57) ABSTRACT

An agricultural harvester includes a straw walker arrangement positioned downstream from a threshing and separating system. The straw walker arrangement includes a first straw walker positioned to receive crop material from the threshing and separating system, a second straw walker positioned downstream from the first straw walker, and a rotatable drum positioned between the first straw walker and the second straw walker. The rotatable drum is operable to convey crop material from the first straw walker to the second straw walker.

18 Claims, 6 Drawing Sheets

(51) Int. Cl.
*A01F 12/46* (2006.01)
*A01D 57/02* (2006.01)
*A01D 41/06* (2006.01)
*A01D 34/02* (2006.01)
*A01F 7/06* (2006.01)
*A01D 101/00* (2006.01)

(52) U.S. Cl.
CPC .............. *A01F 7/06* (2013.01); *A01F 12/444* (2013.01); *A01F 12/446* (2013.01); *A01F 12/46* (2013.01); *A01D 2101/00* (2013.01)

(58) Field of Classification Search
CPC ......... A01F 12/444; A01F 7/06; A01␣57/92; A01D 34/92; A01D 57/02; A01D 41/06; A01D 34/02
See application file for complete search history.

(56) References Cited

U.S. PATENT DOCUMENTS

| | | | | |
|---|---|---|---|---|
| 2,937,647 | A | * | 5/1960 | Allen ................... A01F 12/44 460/85 |
| 3,620,223 | A | * | 11/1971 | Witzel ................ A01F 12/305 460/88 |
| 3,897,332 | A | * | 7/1975 | Delfosse ............... A01F 12/305 460/85 |
| 4,490,964 | A | * | 1/1985 | Eldredge ........... A01D 41/1273 460/5 |
| 6,106,389 | A | * | 8/2000 | Perez-Lopez ......... A01F 12/305 460/101 |
| 6,435,966 | B1 | | 8/2002 | Heidjann et al. |

FOREIGN PATENT DOCUMENTS

| | | | | |
|---|---|---|---|---|
| DE | 4127118 | A1 | | 2/1993 |
| DE | 19632567 | A1 * | 2/1998 | ............ A01F 12/305 |
| DE | 102005050751 | A1 | | 8/2007 |
| EP | 0582097 | A2 * | 2/1994 | ............ A01D 57/10 |
| EP | 1050206 | A1 * | 11/2000 | ............ A01F 12/305 |
| EP | 1961289 | A1 * | 8/2008 | ............ A01D 61/008 |
| FR | 1473891 | A1 * | 10/1965 | |
| FR | 2634346 | A1 | | 1/1990 |
| GB | 1411314 | A | | 10/1975 |
| GB | 2095964 | A | | 10/1982 |
| RU | 2210204 | C2 | | 8/2003 |
| RU | 2212127 | C1 | | 2/2004 |
| SU | 1126239 | A * | 5/1983 | |

\* cited by examiner

STRAW WALKER ARRANGEMENT FOR AN AGRICULTURAL HARVESTER

CROSS REFERENCE TO RELATED APPLICATION

This application is the National Stage of International Application No. PCT/EP2015/063931 filed Jun. 22, 2015, which claims priority to Belgian Application No. 2014/0489 filed Jun. 23, 2014, the contents of which are incorporated herein by reference.

BACKGROUND OF THE INVENTION

The present invention relates to agricultural harvesters such as combines, and, more particularly, to systems for transporting crop material within the combine.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

With conventional combine designs, straw walkers are positioned downstream from the threshing system. The straw walkers oscillate in a fore to aft manner and carry the crop material which does not pass through the concaves to the rear of the combine. Some of the crop material transported by the straw walkers still includes grain. Crop material transported by the straw walkers which includes grain therefore passes with the non-grain crop material to the rear of the combine for discharge to the field. Discharge of the grain with the other non-grain crop material (also known as material other than grain, or MOG) reduces the harvesting efficiency of the combine. If the grain can be better separated from the MOG, then the harvesting capacity of the combine can be increased.

What is needed in the art is a way of better separating grain from MOG in the crop material that is threshed and separated by the threshing and separating system.

SUMMARY OF THE INVENTION

The present invention provides a straw walker arrangement for a combine with a rotatable drum positioned between upstream straw walkers and downstream straw walkers.

The invention in one form is directed to an agricultural harvester, including a straw walker arrangement positioned downstream from a threshing and separating system. The straw walker arrangement includes a first straw walker positioned to receive crop material from the threshing and separating system, a second straw walker positioned downstream from the first straw walker, and a rotatable drum positioned between the first straw walker and the second straw walker. The rotatable drum is operable to convey crop material from the first straw walker to the second straw walker.

An advantage of the present invention is that a higher capacity harvesting system is provided.

Another advantage is that the straw has a better straw quality.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
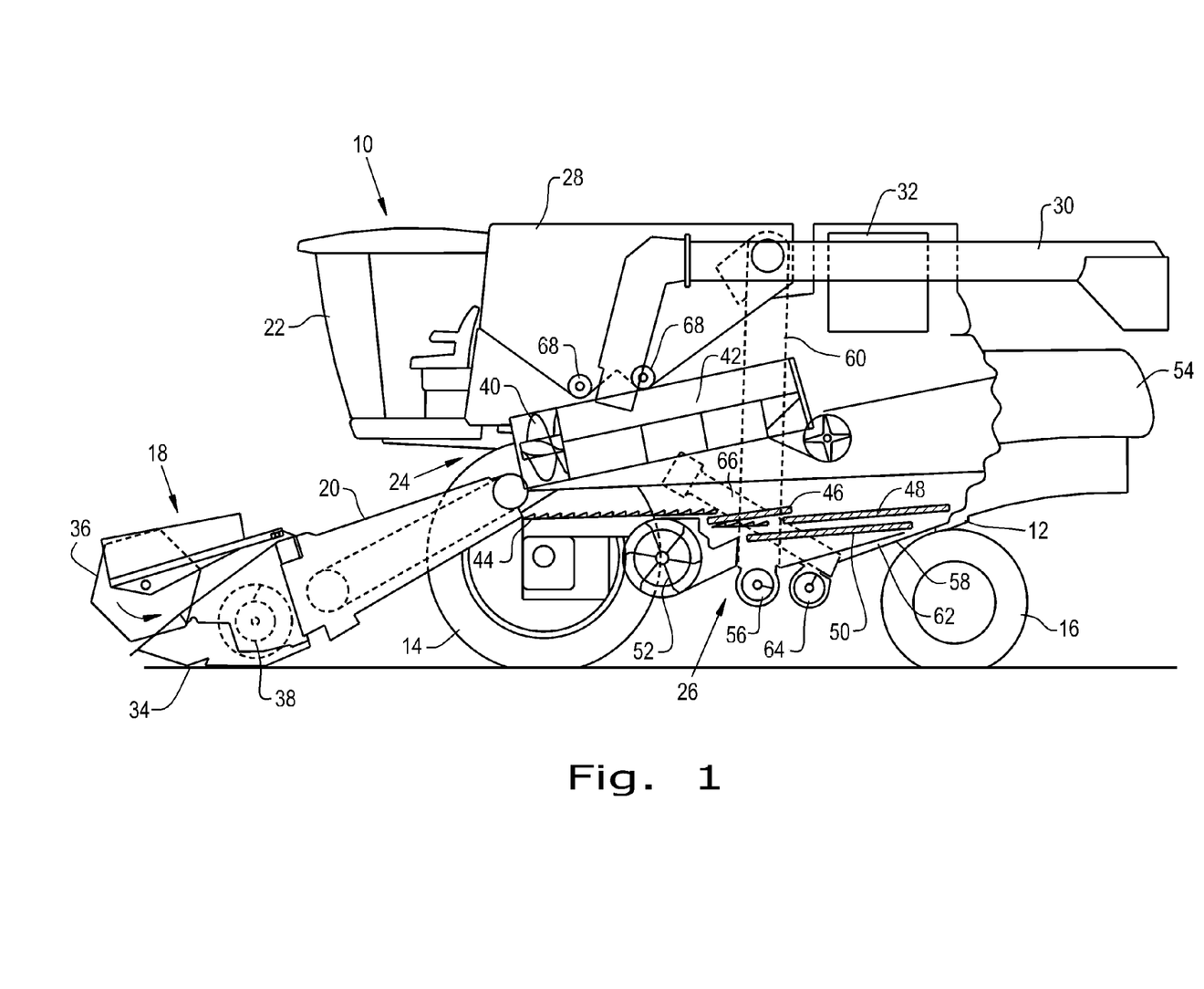
FIG. 1 is a side view of an embodiment of an agricultural harvester in the form of a combine which may include a straw walker arrangement of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
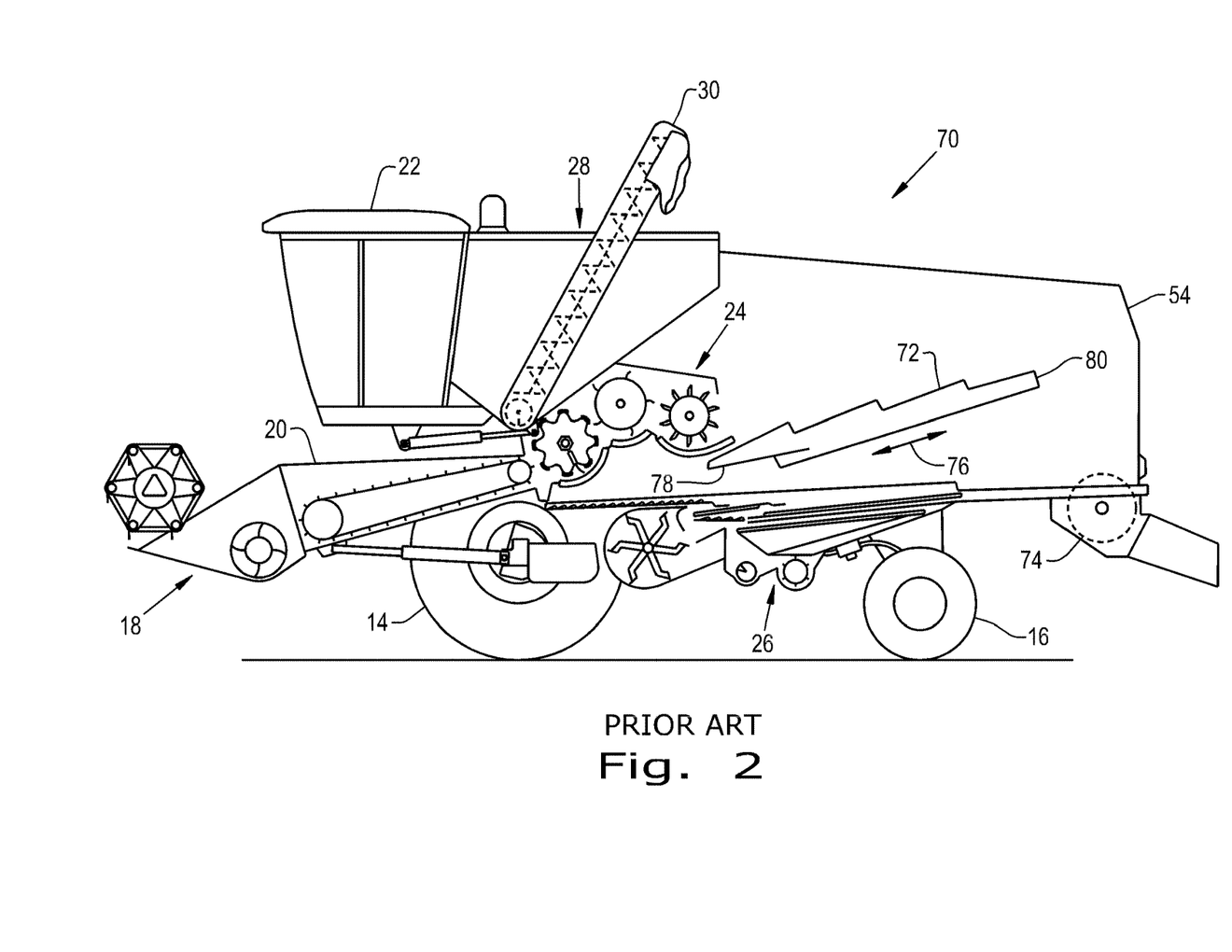
FIG. 2 is a schematic side view of a combine including a conventional straw walker arrangement.

Referring now to FIG. 2, there is shown another embodiment of a combine harvester 70 which includes a header 18, feeder housing 20, operator cab 22, threshing and separating system 24 and cleaning system 26, similar to the embodiment of combine 10 shown in FIG. 1. The threshing and separating system 24 is of the transverse rotor type of threshing system rather than an axial flow type rotor as shown in FIG. 1. Moreover, the combine 70 includes a number of straw walkers 72 which convey straw and other MOG from the threshing and separating system 24 to the chopper/blower 74 for distribution back to the field. A number of straw walkers 72 are positioned side to side across the width of the straw hood 54 (in a direction perpendicular to the drawing of FIG. 2), and reciprocate in a fore to aft manner (indicated by double arrow 76) to move the straw and other MOG rearward to the chopper/blower 74. Each of the straw walkers 72 have an upstream end 78 which is positioned slightly below the rear of the threshing and separating system 24, and a downstream end 80 which is positioned above the entrance to the chopper/blower 74.

According to an aspect of the present invention, and referring now to FIGS. 3-6, there is shown an agricultural combine 100 which includes an embodiment of a straw walker arrangement 102 of the present invention. In the embodiment shown in FIG. 3, the straw walker arrangement 102 is used with a threshing and separating system 24 having a transverse rotor. However, it is also to be understood that the straw walker arrangement 102 can likewise be used with a threshing system having an axial rotor.

The straw walker arrangement 102 is positioned downstream from the threshing and separating system 24 and generally includes an upstream or first straw walker 104, a downstream or second straw walker 106, and a rotatable drum 108 positioned between the first straw walker 104 and the second straw walker 106. Only a single first straw walker 104 and second straw walker 106 are visible in FIGS. 3 and 4; however, it will be appreciated that typically a number of straw walkers are adjacent to each other across the width of straw hood 54 (in a direction perpendicular to the drawing plane of FIGS. 3 and 4).

Figure 3:
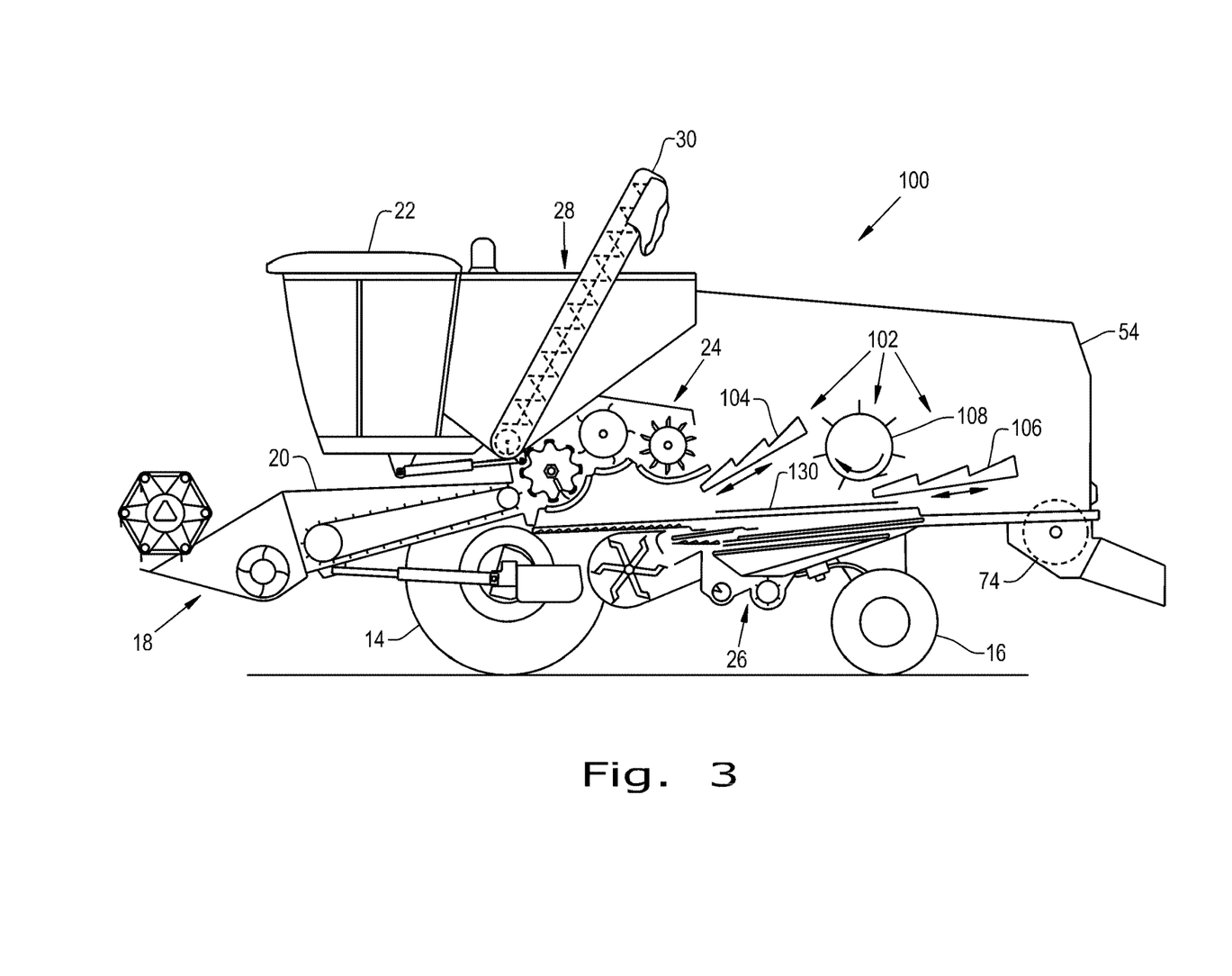
FIG. 3 is a schematic side view of a combine including an embodiment of a straw walker arrangement of the present invention.
Figure 4:
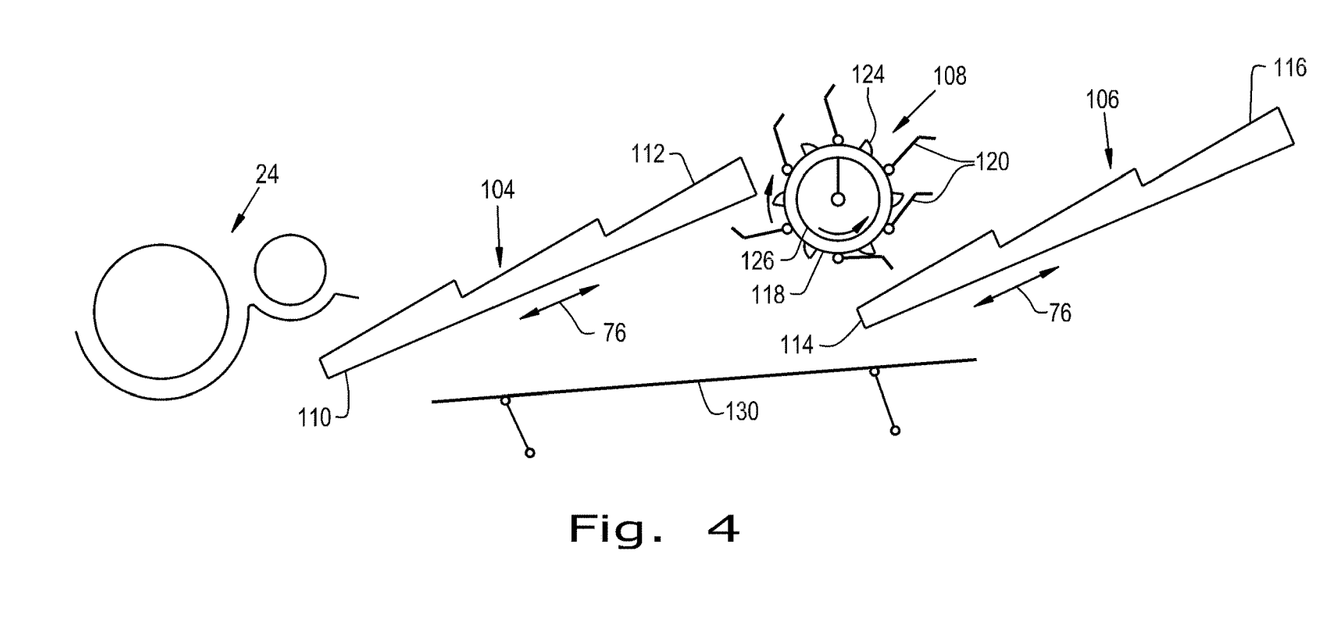
FIG. 4 is a schematic side view of the straw walker arrangement shown in FIG. 3.

The first straw walker 104 has an upstream end 110 which is positioned below a portion of the threshing and separating system 24, and a downstream end 112 which is positioned adjacent to the drum 108. The exact placement location of the upstream end 110 and the downstream end 112 can vary slightly as long as the first straw walker 104 is effective to transfer the crop material from the threshing and separating system 24 to the drum 108.

The second straw walker 106 has an upstream end 114 which is positioned below a portion of the drum 108, and a downstream end 116 which is positioned in communication with the chopper/blower 74. In the embodiment shown, the second straw walker 106 has a downstream end 116 which is positioned above the chopper/blower 74 such that the crop material can fall directly into the chopper/blower 74. The exact placement location of the upstream end 114 and the downstream end 116 can vary slightly as long as the second straw walker 106 is effective to transfer the crop material from the drum 108 to the chopper/blower 74 (or directly to the ground if the chopper/blower 74 is not used).

The drum 108 includes an outer periphery 118 with a plurality of tines 120 extending radially from the periphery 118. The tines 120 are pivotable about a pivot axis (not numbered) which is generally parallel to an axis of rotation 122 of the drum 108. More specifically, the tines 120 are pivoted to a folded position as the tines rotate past the upstream end 114 of the second straw walker 106. This pivoting action allows the crop material to be deposited onto the second straw walker 106 without picking up additional crop material from the upstream end 114. Mechanisms for pivoting the tines of a rotatable drum or reel are known in the agricultural technologies, and thus not described in further detail herein. For example, reference is hereby made to U.S. Pat. No. 8,590,284 (Rayfield), which is assigned to the assignee of the present invention.

Figure 7:
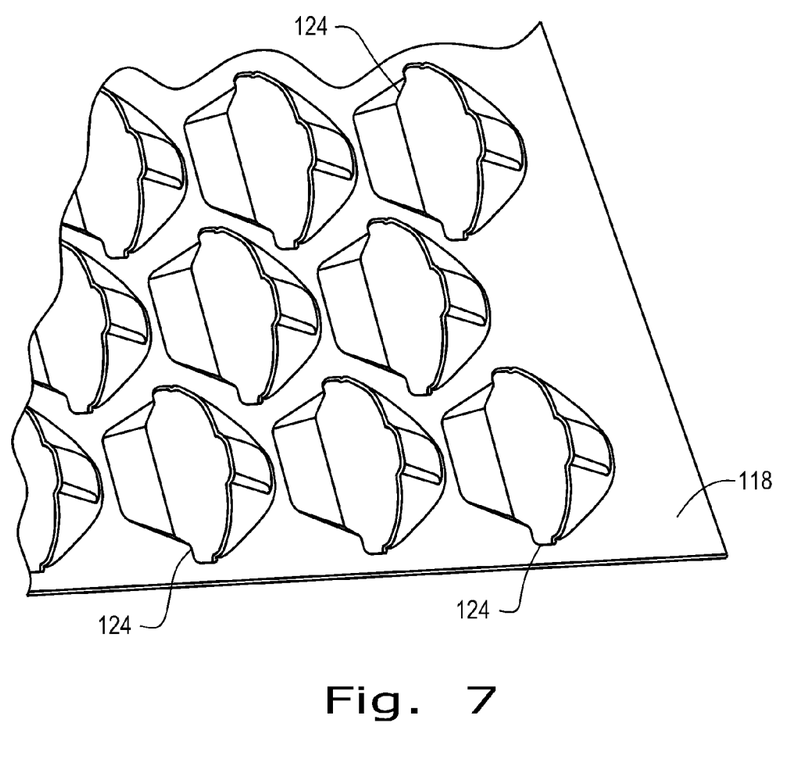
FIG. 7 is a more detailed perspective view of the openings in the outer shell of the drum.

The drum 108 also includes a plurality of openings 124 which extend through the outer periphery 118 to the interior of drum 108. In general, the openings 124 are sized and configured to allow grain to pass through the outer periphery 118 to the interior of drum 108. In the illustrated embodiment, the openings 124 are configured as "graeple" openings with a generally D-shaped configuration which can be formed by a stamping operation (see FIG. 7). A graeple opening is typically used in a graeple sieve as an extension on a corn sieve, and allows more corn to pass through the sieve. It will be appreciated, however, that the openings 124 can be configured with many sizes, shapes and numbers in the outer periphery 118 of drum 108, depending on the application.

Figure 5:
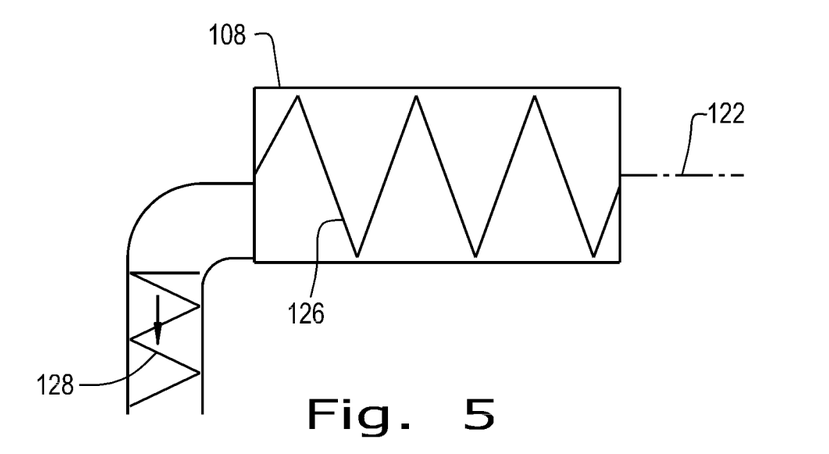
FIG. 5 is a top view of the drum in the straw walker arrangement of FIG. 4, showing the internal auger.
Figure 6:
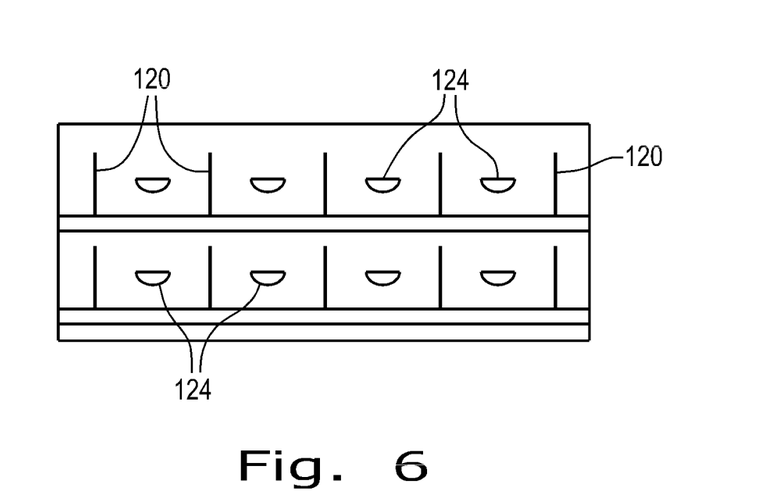
FIG. 6 is a more detailed view of the outer periphery of the drum shown in FIGS. 4 and 5.

An auger 126 is positioned within the interior of drum 108 and has an outside diameter which is slightly smaller than the inside diameter of the drum 108. The auger 126 functions to convey grain laterally within the drum 108 to a return conveyor 128, which in turn conveys the grain to the cleaning system 26. The auger 126 is shown as rotating in a direction which is counter to the direction of rotation of drum 108, but can also rotate in the same direction as drum 108. The return conveyor 128 is also assumed to be configured as an auger, but could be differently configured such as a chain elevator or belt conveyor.

A shaker pan 130 is positioned below each of the first straw walker 104, second straw walker 106 and drum 108. The shaker pan 130 functions to transport crop material which falls from the first straw walker 104, second straw walker 106 and drum 108 to the cleaning system 26 (from right to left in each of FIGS. 3 and 4). The shaker pan 130 oscillates in a fore to aft manner and can include ridges, fingers, etc. in known manner to transfer the crop material to the cleaning system 26, particularly the shaker pan 44 under the concaves or the front sieve 46 of the cleaning system 26 (refer to FIG. 1).

Each of, or only some of, the various components making up the straw walker arrangement 102 can be configured with a constant or adjustable operating speed. For example, any or all of the first straw walker 104, second straw walker 106, drum 108 and/or shaker pan 130 can be configured with a constant or adjustable operating speed.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvester comprising:
    a threshing and separating system; and
    a straw walker arrangement positioned downstream from the threshing and separating system, the straw walker arrangement comprising:
        a first straw walker positioned to receive crop material from the threshing and separating system;
        a second straw walker positioned downstream from the first straw walker;
        a rotatable drum positioned between the first straw walker and the second straw walker, the rotatable drum being operable to convey crop material from the first straw walker to the second straw walker, the drum having a plurality of tines extending radially from a periphery thereof, the drum also having a plurality of openings extending through the periphery; and
        an auger positioned within an interior of the drum for conveying grain laterally within the drum.

2. The agricultural harvester of claim 1, wherein the tines are pivotable about a pivot axis which is generally parallel to an axis of rotation of the drum.

3. The agricultural harvester of claim 2, wherein the tines are configured to be pivoted to a folded position when adjacent to the second straw walker.

4. The agricultural harvester of claim 1, wherein the openings are graeple openings.

5. The agricultural harvester of claim 1, further comprising a return conveyor in communication with the auger for returning the grain to a cleaning system.

6. The agricultural harvester of claim 1, wherein the drum has an adjustable rotation speed.

7. The agricultural harvester of claim 1, wherein the first straw walker has an upstream end positioned below a portion of the threshing and separating system, and the second straw walker has a downstream end positioned in communication with a chopper/blower.

8. The agricultural harvester of claim 7, wherein the first straw walker has a downstream end positioned adjacent to the drum, and the second straw walker has an upstream end positioned below a portion of the drum.

9. The agricultural harvester of claim 1, wherein each of the first straw walker and the second straw walker has an adjustable oscillation speed.

10. The agricultural harvester of claim 1, further comprising a shaker pan positioned below each of the first straw walker, the second straw walker, and the drum, the shaker pan being operable to transport crop material to a cleaning system.

11. A straw walker arrangement for use in an agricultural harvester, comprising:
- a first straw walker positioned to receive crop material from a threshing and separating system;
- a second straw walker positioned downstream from the first straw walker;
- a rotatable drum positioned between the first straw walker and the second straw walker, the rotatable drum being operable to convey crop material from the first straw walker to the second straw walker; and
- an auger positioned within an interior of the drum for conveying grain laterally within the drum.

12. The straw walker arrangement of claim 11, wherein the drum includes a plurality of tines extending radially from a periphery thereof.

13. The straw walker arrangement of claim 12, wherein the tines are pivotable about a pivot axis which is generally parallel to an axis of rotation of the drum.

14. The straw walker arrangement of claim 13, wherein the tines are pivoted to a folded position when adjacent to the second straw walker.

15. The straw walker arrangement of claim 12, wherein the drum includes a plurality of openings extending through the periphery.

16. The straw walker arrangement of claim 15, wherein the openings are graeple openings.

17. The straw walker arrangement of claim 11, further including a shaker pan positioned below each of the first straw walker, the second straw walker and the drum, the shaker pan being operable to transport crop material to a cleaning system.

18. The straw walker arrangement of claim 11, wherein the first straw walker has a downstream end positioned adjacent to the drum, and the second straw walker has an upstream end positioned below a portion of the drum.

* * * * *